(12) United States Patent
Aalipour Hafshejani et al.

(10) Patent No.: US 11,430,445 B2
(45) Date of Patent: Aug. 30, 2022

(54) DETECTING VOICE GROCERY CONCEPTS FROM CATALOG ITEMS

(71) Applicant: Walmart Apollo, LLC, Bentonville, AR (US)

(72) Inventors: Ghodratollah Aalipour Hafshejani, San Jose, CA (US); Phani Ram Sayapaneni, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 371 days.

(21) Appl. No.: 16/777,775

(22) Filed: Jan. 30, 2020

(65) Prior Publication Data

US 2021/0241774 A1 Aug. 5, 2021

(51) Int. Cl.
*G10L 15/26* (2006.01)
*G06F 16/9032* (2019.01)
*G06Q 30/06* (2012.01)

(52) U.S. Cl.
CPC ........ *G10L 15/26* (2013.01); *G06F 16/90332* (2019.01); *G06Q 30/0627* (2013.01); *G06Q 30/0641* (2013.01)

(58) Field of Classification Search
None
See application file for complete search history.

(56) References Cited

U.S. PATENT DOCUMENTS

| | | | |
|---|---|---|---|
| 6,144,938 A * | 11/2000 | Surace | H04M 3/4936 704/E13.004 |
| 6,757,362 B1 * | 6/2004 | Cooper | H04M 3/527 379/88.16 |
| 2002/0143550 A1 | 10/2002 | Nakatsuyama | |
| 2005/0033582 A1 * | 2/2005 | Gadd | G10L 15/26 704/E15.04 |
| 2015/0106078 A1 * | 4/2015 | Chang | G06F 16/35 704/9 |
| 2017/0124447 A1 * | 5/2017 | Chang | G06F 40/279 |
| 2018/0261223 A1 | 9/2018 | Jain et al. | |
| 2019/0114528 A1 * | 4/2019 | Xiong | G06Q 30/0242 |
| 2019/0171711 A1 | 6/2019 | Carpenter, II et al. | |
| 2019/0236680 A1 * | 8/2019 | Kounine | G06N 20/00 |
| 2019/0385614 A1 | 12/2019 | Kim et al. | |
| 2019/0392082 A1 * | 12/2019 | Bell | G06N 3/08 |
| 2021/0034684 A1 * | 2/2021 | Iyer | G06N 3/0472 |
| 2021/0233124 A1 * | 7/2021 | Rahman | G06Q 30/0629 |

* cited by examiner

*Primary Examiner* — Neeraj Sharma

(57) ABSTRACT

A system including one or more processors and one or more non-transitory computer-readable media storing computing instructions configured to run on the one or more processors and perform receiving a voice command from a user to perform a virtual action intended to apply to one item of two or more items in a cart of the user; generating a concept vector representing a concept in the voice command; transforming the respective item attributes for each of the two or more items into a respective feature vector; generating a respective candidate score for the each of the two or more items; identifying the one item to which the voice command is intended to apply; and executing an action with respect to the one item based on the voice command. Other embodiments are disclosed.

20 Claims, 8 Drawing Sheets

DETECTING VOICE GROCERY CONCEPTS FROM CATALOG ITEMS

TECHNICAL FIELD

This disclosure relates generally relates to a detecting voice grocery concepts from catalog items.

BACKGROUND

Sometimes, users order items from an online website using a voice assistant to create an online order. A voice command from a user can be ambiguous when two or more items have similar titles. Such ambiguities often lead to adding or removing items from a cart of the user that was not the intention of the voice command.

BRIEF DESCRIPTION OF THE DRAWINGS

To facilitate further description of the embodiments, the following drawings are provided in which.

Figure 1:
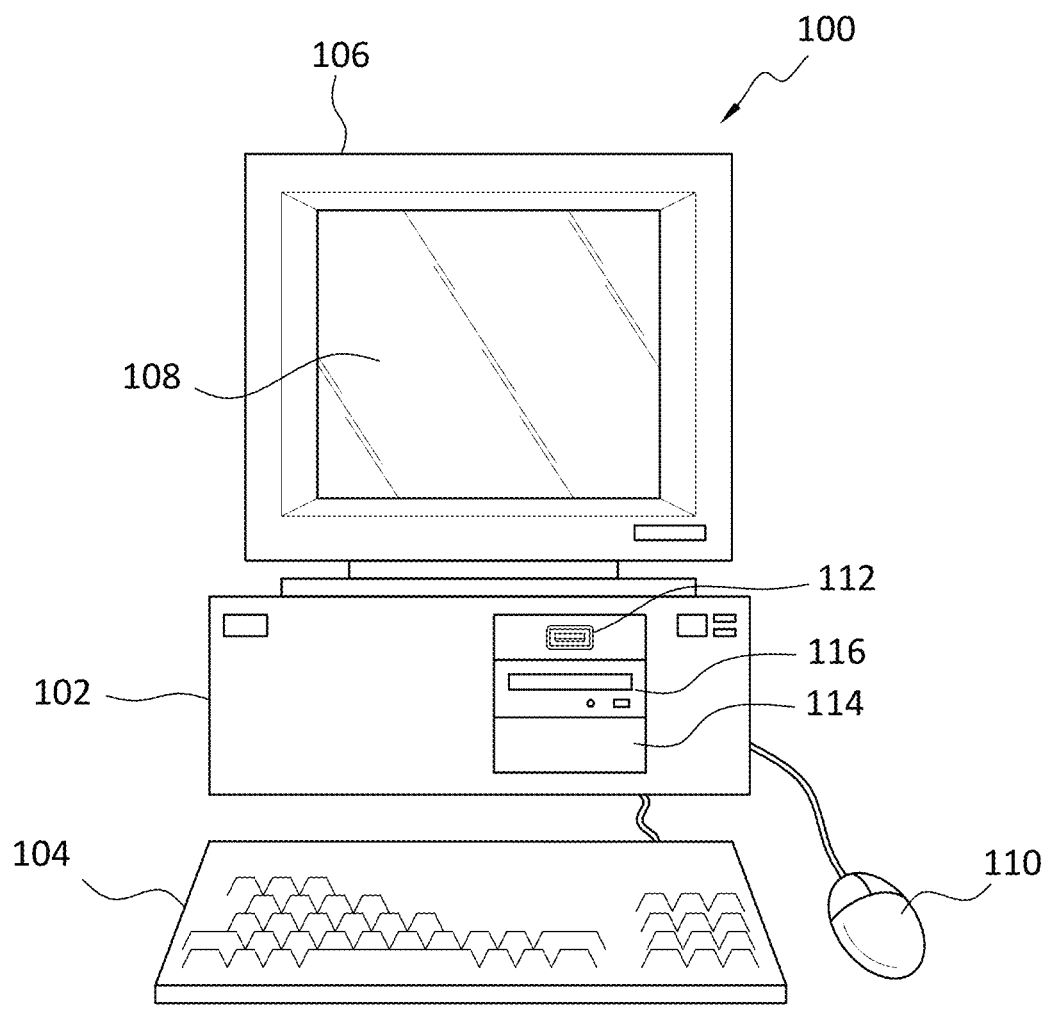
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, or ten seconds.

DESCRIPTION OF EXAMPLES OF EMBODIMENTS

In many embodiments, a voice command system can provide a technique to enable a virtual voice assistant to employ when an ambiguity is detected in a voice command that can be applied to more than one item in an electronic cart. In many embodiments, a voice command can be ambiguous when two or more items in a catalog share a similar title or key word in a title. Such a voice command system can allow users to order items from an online website using a variety of commands, queries, and/or colloquialisms by speaking into any voice enabled user device.

Figure 2:
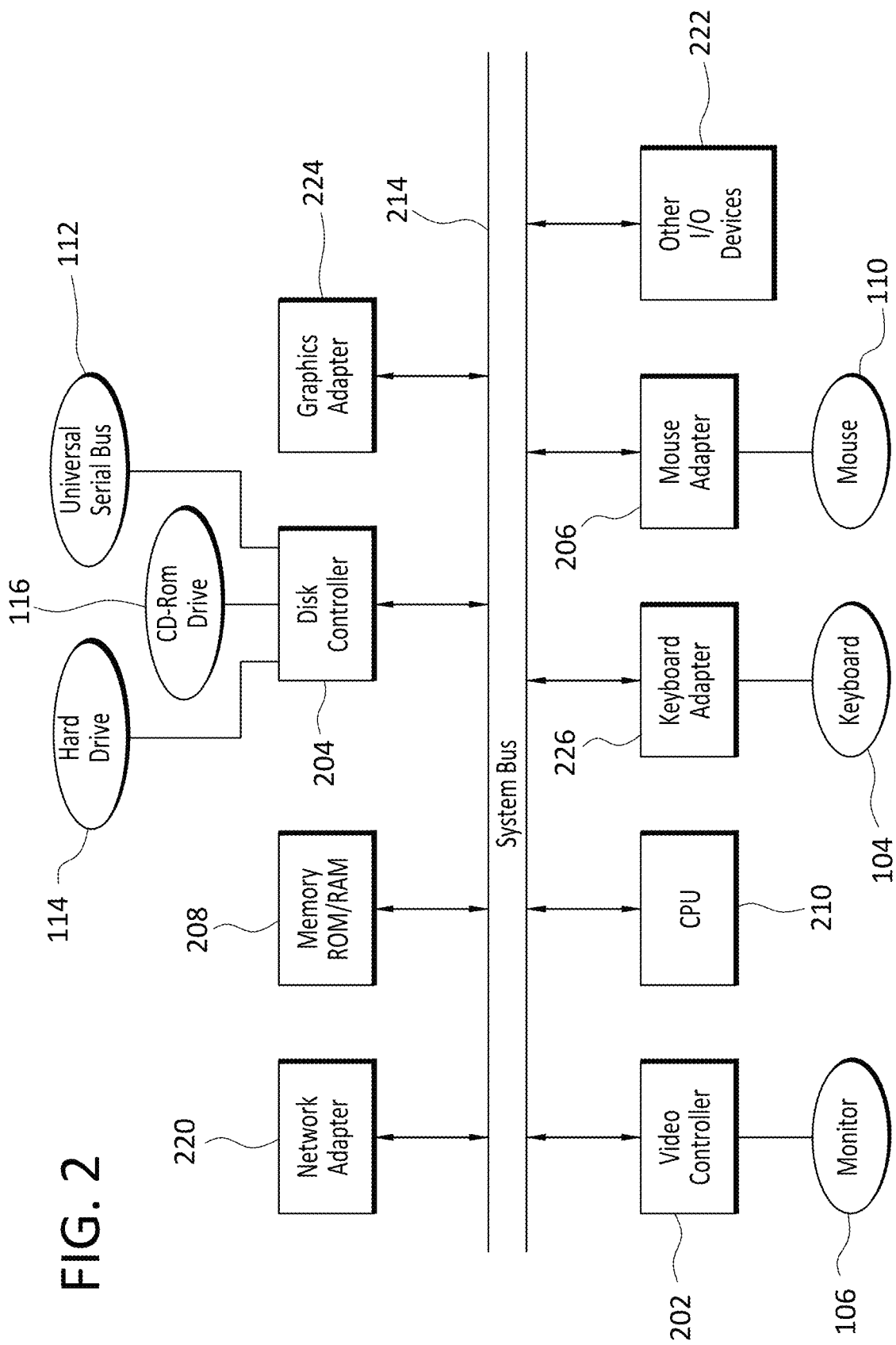
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIGS. 1-2). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
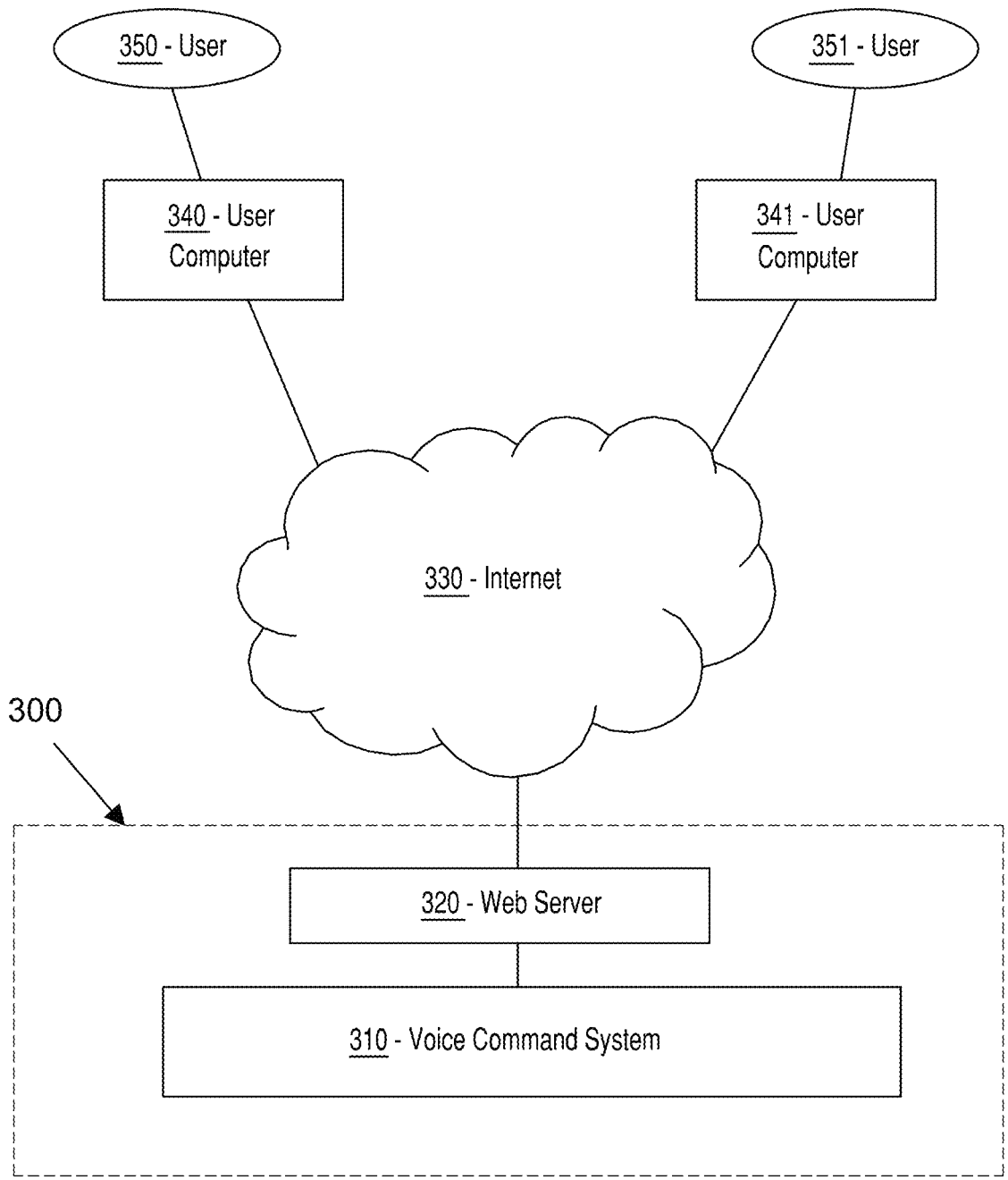
FIG. 3 illustrates a block diagram of a system that can be employed for detecting voice grocery concepts from catalog items, according to an embodiment.

Turning ahead in the drawings, FIG. 3 illustrates a block diagram of a system 300 that can be employed for detecting voice grocery concepts from catalog items. In a number of embodiments, system 300 can receive a voice command for an online order and implement a virtual action intended to apply to one item among others in a cart, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a voice command system 310 and/or a web server 320. Voice command system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host voice command system 310 and web server 320. Additional details regarding voice command system 310 and/or web server 320 are described herein. In a number of embodiments, each of voice command system 310 and/or web server 320 can be a special-purpose computer programed specifically to perform specific functions not associated with a general-purpose computer, as described in greater detail below.

In some embodiments, web server 320 can be in data communication through Internet 330 with one or more user computers, such as user computers 340 and/or 341. Internet 330 can be a public or private network. In some embodiments, user computers 340-341 can be used by users, such as users 350 and 351, which also can be referred to as customers, in which case, user computers 340 and 341 can be referred to as customer computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities.

In some embodiments, an internal network that is not open to the public can be used for communications between voice command system 310 and/or web server 320 within system 300. Accordingly, in some embodiments, voice command system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, voice command system 310 and/or web server 320 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to voice command system 310 and/or web server 320, in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part voice command system 310 and/or web server 320. In a similar manner, the processors and/or the non-transitory computer-readable media can be local and/or remote to each other.

Meanwhile, in many embodiments, voice command system 310 and/or web server 320 also can be configured to communicate with and/or include one or more databases and/or other suitable databases. The one or more databases can include a product database that contains information about products, items, or SKUs (stock keeping units), for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit, or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between voice command system 310 and/or web server 320, and/or the one or more databases, can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In some embodiments, voice command system 310 can be a general-purpose computer or a special-purpose computer programmed to perform specific functions and/or applications. For example, voice command system 310 can receive a voice command from a user (e.g., 350-351) that the user intends to apply to an item in the cart, and determining which item in the cart should apply, even in the presence of ambiguity. By determining the item in the cart that the voice command actually applies to, the voice conversation can become more natural and involve fewer clarification questions.

Figure 4:
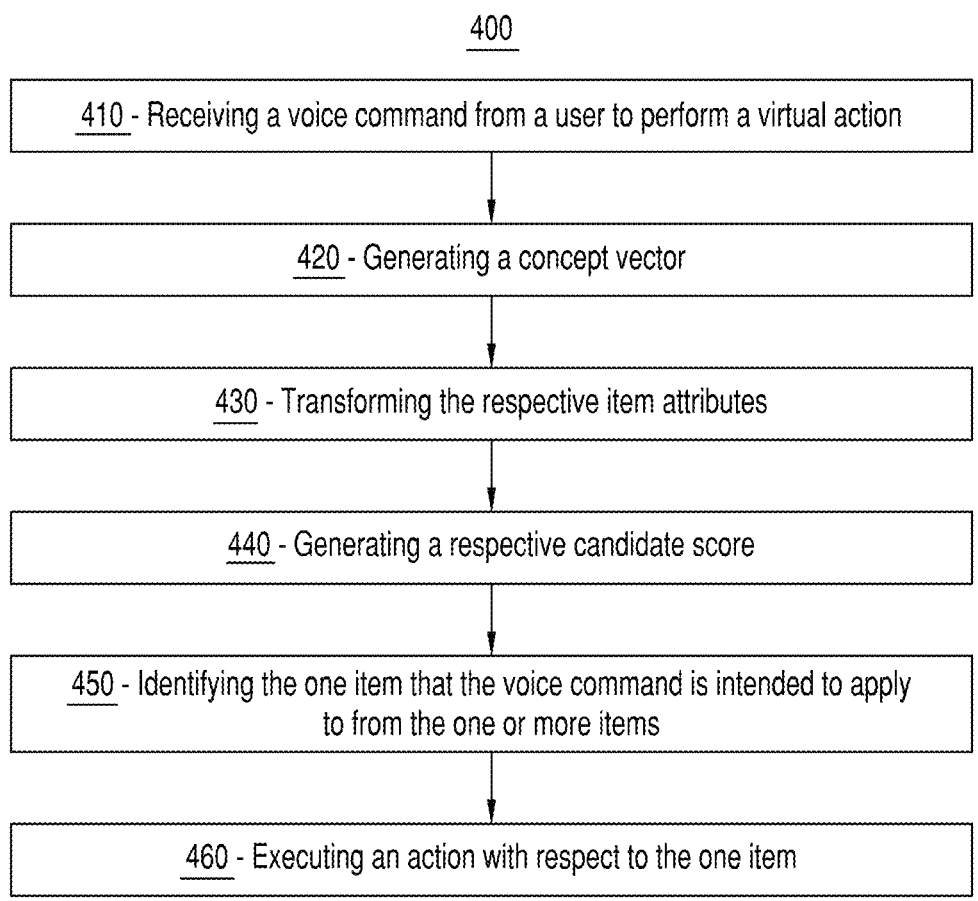
FIG. 4 illustrates a flow chart for a method, according to another embodiment.

Turning ahead in the drawings, FIG. 4 illustrates a flow chart for a method 400, according to another embodiment. In some embodiments, method 400 can be a method of detecting voice grocery concepts from catalog items. In many embodiments, method 400 can involve automatically identifying an item in an electronic cart from a voice command from a user, such as users 350-351 (FIG. 3) using a voice command system. In several embodiments, the voice command and/or query (e.g., utterance) can be ambiguous when the voice command can apply to more than one item in a cart and/or a catalog. In many embodiments, identifying an item that the voice command intended to apply to one item can involve generating (i) a concept vector (as described below in connection with block 420), (ii) a feature vector (as described below in connection with block 430) and/or (iii) a candidate score (as described below in connection with block 440). Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as voice command system 310 and/or web server 320. The processor(s) can be similar or identical to the processor(s) described above with respect to computer system 100 (FIG. 1).

Referring to FIG. 4, method 400 can include a block 410 of receiving a voice command from a user to perform a virtual action intended to apply to one item of two or more items in a cart of the user. In various embodiments, the two or more items can each be associated with respective item attributes. In many embodiments, items in a cart of the user can be products. In some embodiments, the voice command and/or query (e.g., utterance) can be interpreted as ambiguous when two or more items within a cart have titles and/or attributes that could apply to the voice command. In several embodiments, two or more items can each be associated with a same product type and can have different title descriptions. In many embodiments, a user can speak directly to a user device and utter the voice command to order items on an online website that can be recognized by a virtual assistant to (i) locate the item in a catalog and/or (ii) add the item to a cart. Using the voice command to order items from a catalog can be advantageous by reducing the amount of computer resources expended when a user manually searches for items in an online catalog for a large retail store. Such an online catalog for a large retail store can include over eight million (8,000,000) items at any given time. Reducing the use of computer resources can frequently include CPU usage, memory stores, databases, internet traffic, and/or other related computer resources used for website visits.

In a number of embodiments, voice commands can include a variety of requests, statements, and/or queries for an item in a catalog. For example, the user can say "I want chocolate," "add to two gallons of milk," or another suitable voice command. In various embodiments, the voice command can be ambiguous when two or more items have similar titles even though each item can belong to a different product type. For example, a user can utter a voice command to "remove milk from the cart." A search of all the items in the cart indicate that more than one title of two items include the word "milk." Of the items in the cart, each item with the word "milk" in its title can have a different product type, in some cases. For example, one item in the cart can have a title "Pantene Pro-V Blends Micellar Conditioner Gentle Moisturizing Milk," which can have a product type of Conditioner, and another item in the cart can have a title "Horizon Organic DHA Omega-3 Vitamin D Organic Whole Milk," which can have a product type of Dairy. Because each of these two items has the term "milk" in the title, there can be ambiguity as for the item to which the user intends the voice command to apply.

In many embodiments, each of the two or more items can include respective item attributes, such as a product type, a global product type, a shelf title, an aisle title, a category, a department, and/or other suitable attributes, which in some embodiments can be hierarchical. In several embodiments, an online catalog for a retailer can include a list of over 190 attributes (e.g., item categories, product types, descriptions, and/or other such item information) including a title for each item. In some embodiments, a list of attributes in a catalog can provide a wide array of information for each item ranging from specific item descriptions (e.g., specific category department, aisle, shelf, among others) to broader categories that group items into generalized categories. In many embodiments, items in a catalog can include attributes that share the same generic concepts, such as product type and/or global product type.

Figure 6:
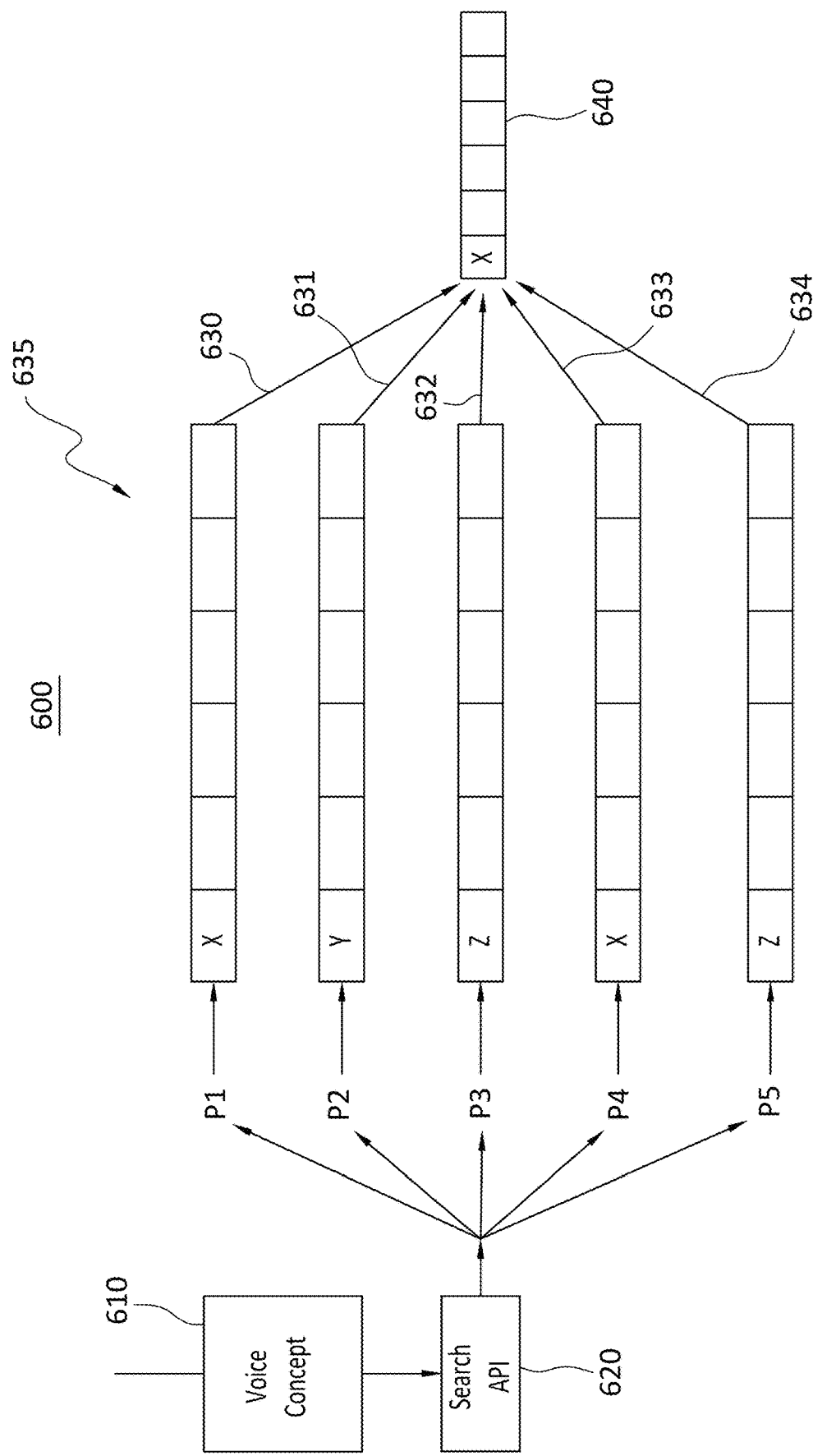
FIG. 6 illustrates a flow diagram for a method, according to another embodiment.

In several embodiments, method 400 also can include a block 420 of generating a concept vector representing a concept in the voice command relating to the one of the two or more items. For example, the concept in the voice command can be "milk," "conditioner," and/or another suitable concept. In several embodiments, the concept from the voice command can be used to search a catalog for items using the concept as a search query, such as shown in FIG. 6 and described below.

In various embodiments, block 420 of generating the concept vector representing a concept in the voice command relating to the one of the two or more items can include performing a search using the concept as a search query to determine a set of items associated with the concept. In several embodiments, the voice concept used as a search query can be used to search an application programming interface (API) for an online catalog. In some embodiments, results from the search of the online catalog can be limited to a top "n" number of a set of items in the catalog based on the voice concept, such as the top five items (e.g., top five best selling items, or top five relevant items, or other criteria user by the search engine) based on the search query. For example, if the voice concept is milk, searching the search API with a search query of milk can list the five top-selling items that are milk. As another example, if the voice concept is conditioner, the search API can list the five top-selling items that are conditioner in the catalog. In some embodiments, using the search API can be performed on each item candidate in a cart to determine which of the items in a set of items are associated with the concept in the voice command.

In some embodiments, block 420 of generating the concept vector representing a concept in the voice command relating to the one of the two or more items can include generating the concept vector based on common attributes across the set of items associated with the concept. In many embodiments, generating the concept vector can include searching for common attributes and/or features among the set of items returned from the search API. In several embodiments, searching common attributes among one or more items can include determining common attributes that describe the item and/or common attributes based on generic concepts, such as product type, global product type, or another suitable generic attribute. In various embodiments, a concept vector can include a summation of a predetermined number of attributes and/or features for each item. For example, a concept for conditioner can include six (6) common attributes, such as product type (PT), global product type (GPT), shelf title (ST), aisle title (AT), category (CT), and department (DT).

Table 1 below shows an exemplary set of attribute values that are common based on results of the search API using the concept vector as a search query. In several embodiments, a concept vector for conditioner and the six common attributes and its features listed in an online catalog can be represented in the concept vector for the concept. In many embodiments, the value of "Conditioners" for product type (PT) can be base that value for the product type attribute being the most common among the five items found from the search using the concept of "conditioner."

TABLE 1

Concept Vector for Conditioner

| PT | GPT | ST | AT | CT | DT |
|---|---|---|---|---|---|
| "Conditioners" | "Conditioners (hair)" | "Conditioner" | "Hair Care" | "Health" | "Beauty" |

In many embodiments, the six values can be encoded (e.g., projected into a vector space), as described below to create a representation vector as the concept vector.

In a number of embodiments, method 400 further can include a block 430 of transforming the respective item attributes for each of the two or more items into a respective feature vector for the each of the two or more items. In various embodiments, transforming attributes into a feature vector can include an n level of values, such, as six (6) values, and a predetermined number of vector lengths based on a majority of vector lengths among the set of features in the feature vector. For example, the values associated with the attributes of product type (PT), global product type (GPT), shelf title (ST), aisle title (AT), category (CT), and department (DT) for the item can be used to create the feature vector, using an encoding (e.g., projection into a vector space), as described below.

Figure 7:
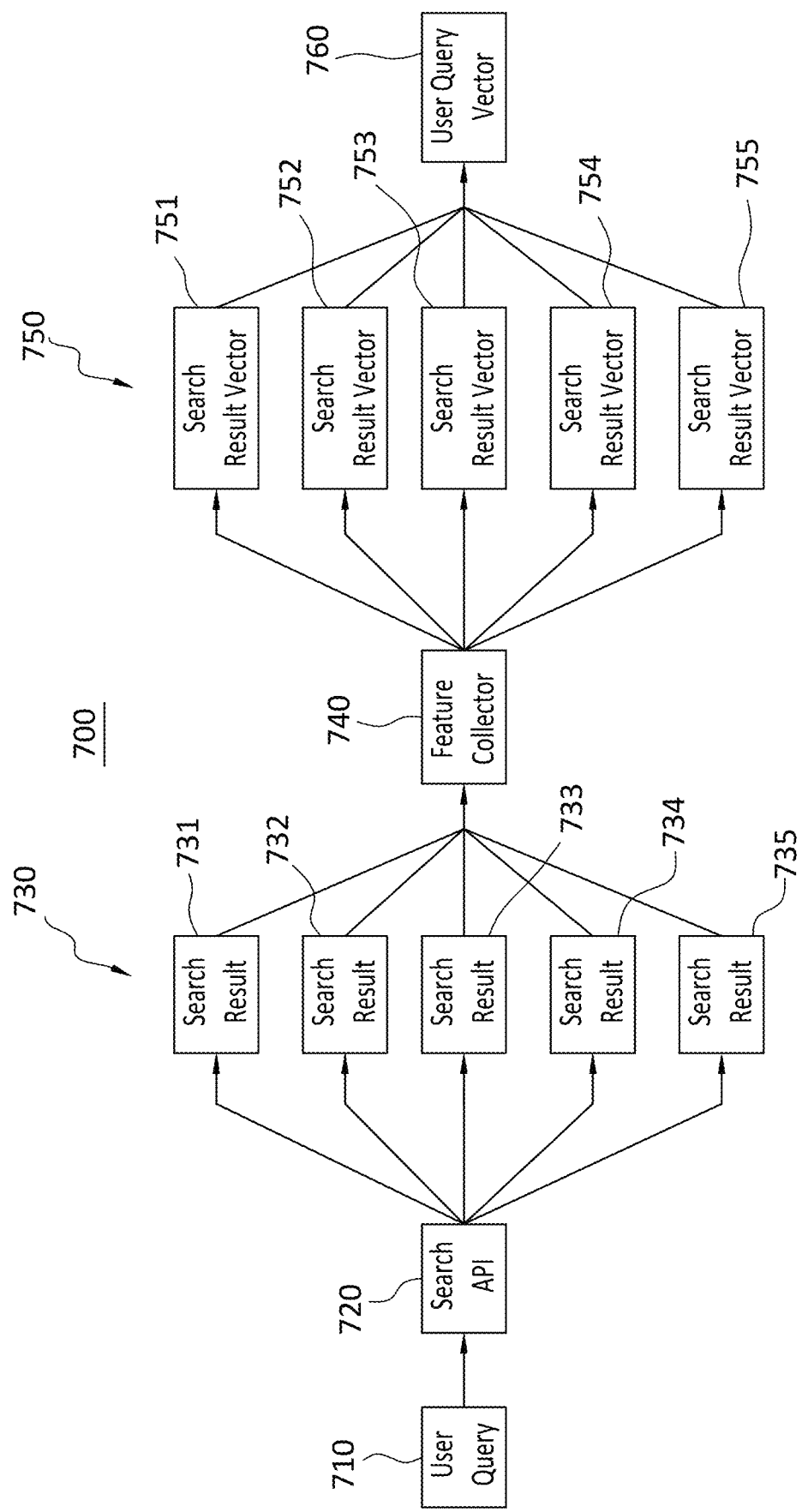
FIG. 7 illustrates a flow diagram for a method, according to another embodiment.
Figure 8:
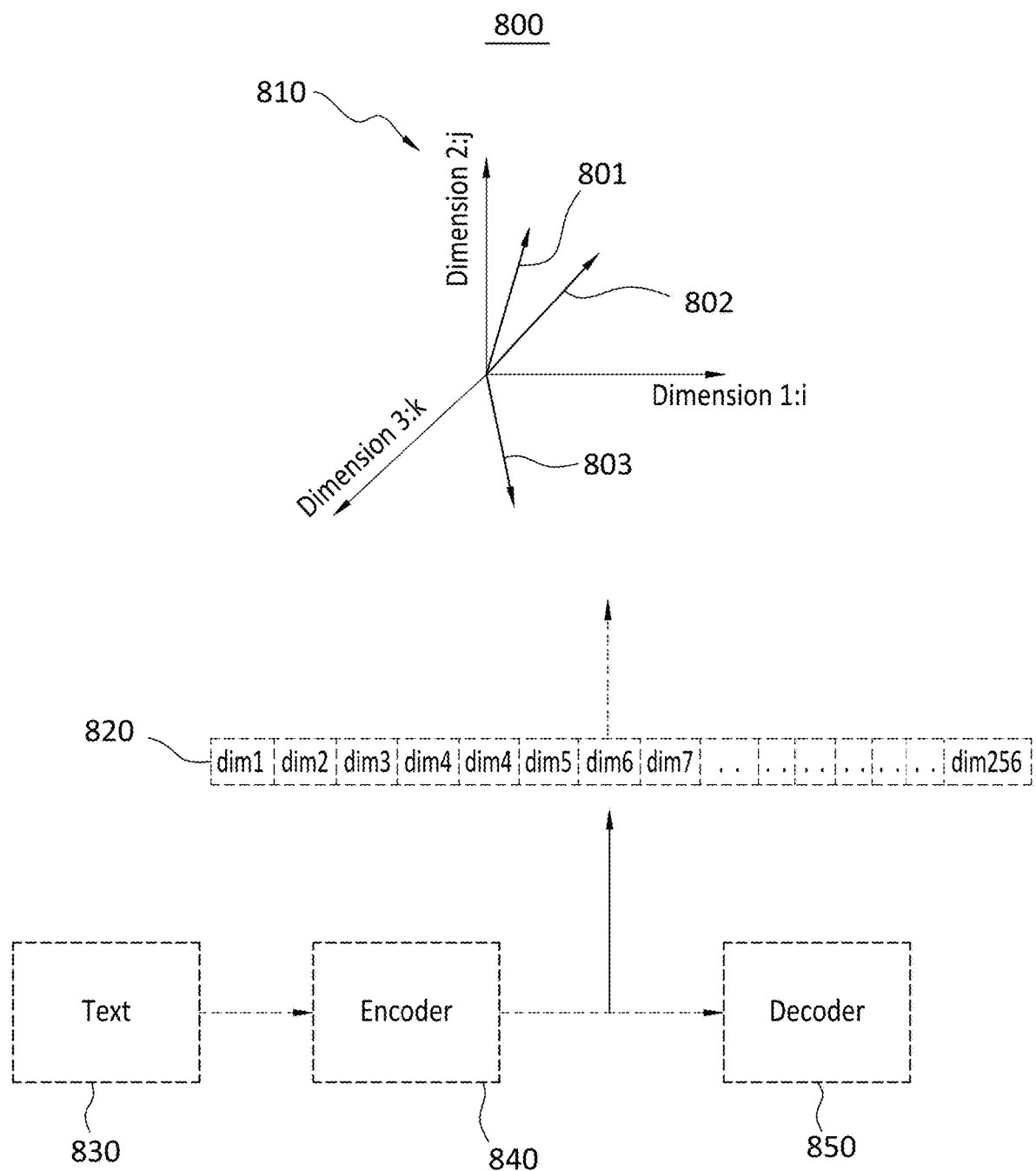
FIG. 8 illustrates a flow diagram for a method, according to another embodiment.

In several embodiments, block 430 of transforming the respective item attributes for each of the two or more items into a respective feature vector for the each of the two or more items can include generating respective embeddings for the respective item attributes for the each of the two or more items. In many embodiments, transforming item attributes into the vector can transform text of each feature into a numerical form the represents the text information for analysis by a computer system as a feature vector, as shown in FIGS. 7-8 and described below.

In some embodiments, method 400 additionally can include a block 440 of generating a respective candidate score for the each of the two or more items based at least in part on the concept vector and the respective feature vector for the each of the two or more items. In several embodiments, each candidate score for each item of the two or more items can be used to determine which concept matches each item. For example, if two or more items in a cart share a word or phrase in each title of each item, the candidate score can identify which of the items belong to one concept and/or whether two or more items belong to the same concept. As another example, two items share the word "chocolate" in the title for each item, such as chocolate milk and chocolate banana slices. Generating a candidate score for each item can determine that chocolate milk belongs to the concept "milk," and chocolate banana slices belongs to a concept "fruit."

In many embodiments, block 440 of generating a respective candidate score for the each of the two or more items based at least in part on the concept vector and the respective feature vector for the each of the two or more items can include generating a respective search query frequency score for the each of the two or more items. In many embodiments, the respective search query frequency score for the each of the two or more items can be based on a search performed using a search query that is based on a concatenation of (a) a respective brand of the each of the two or more items and (b) the concept, as described above in further detail. In some embodiments, when the feature similarity score between the concept vector and the feature vector result in a tie score (e.g., scores are the same), the search frequency score can be used to break the tie.

In some embodiments, generating the search query frequency score can include forming a concatenation of a "brand" plus a "concept" then using the concatenation as a search query in a search to generate search results, which can include a search query frequency list. In several embodiments, performing the searching can include measuring the number of matches and/or hits of the concatenation that occur within the search query frequency list. For example, a brand, such as "Pantene" from an item "Pantene shampoo", plus the concept such as "milk," can be concatenated as "Pantene milk." In such a concatenation, "Pantene milk" can receive few hits, indicating a low frequency was found as a result of searching the search query frequency list, and that the concept associated with the item "Pantene shampoo" likely is not milk. In another such concatenation, a brand, such as "Pantene" for the item "Pantene shampoo," plus a concept such as "conditioner," can be concatenated as "Pantene conditioner." In such a concatenation, "Pantene conditioner" can receive many hits, indicating a high frequency was found as a result of searching the search query frequency list indicating that the concept of "conditioner" likely is associated with the item "Pantene shampoo." In many embodiments, a normalized frequency score (e.g., normalized to eliminate units of measure) can be the search query frequency score. In several embodiments, the search query frequency list can result in the search query frequency score for the item.

In a number of embodiments, block 440 generating a respective candidate score for the each of the two or more items based at least in part on the concept vector and the respective feature vector for the each of the two or more items can include generating a respective feature vector similarity score for the each of the two or more items. In several embodiments, generating the feature score similarity can include comparing side by side each attribute value of the concept vector with each attribute value of a feature vector, which in many embodiments can be a comparison of the projected vector representation of the attribute values.

In several embodiments, the respective feature vector similarity score for the each of the two or more items can be generated using a Jaccard Similarity measurement between (a) the concept vector for the concept and (b) the respective feature vector for the each of the two or more items. In many embodiments, the Jaccard Similarity measurement can be determined for each pair of the concept vector and the feature vector of an item. In some embodiments, the Jaccard Similarity approach can generate a similarity score using a range from 0 to 1. In some embodiments, the output score of 1 can indicate that the concept vector and the feature vector are highly likely to be similar. In several embodiments, an output score of 0 can indicate that the concept vector and the feature vector are highly unlikely to be similar. Generally, the output score will be somewhere in the range of 0 to 1. In many embodiments, the Jaccard similarity scores for the features of the feature vector can be summed to generate the feature vector similarity score. In many embodiments, the feature vector similarity score can be an indicator of a degree to which the concept vector and the feature vector are similar.

In other embodiments, the respective feature vector similarity score for the each of the two or more items can be generated using a Cosine Similarity measurement between (a) the concept vector for the concept and (b) the respective feature vector for the each of the two or more items. In some embodiments, generating the feature vector similarity score also can be calculated using the Cosine similarity measurement and can generate an output score using a range from $-1$ to 1. In many embodiments, calculating the distance (e.g., a measure of similarity) between the concept vector and the feature vector can include measuring the cosine of the angle between the two vectors as projected in a multi-dimensional projection space, such as shown in FIG. 8 and described below.

In various embodiments, block 440 of generating a respective candidate score for the each of the two or more items based at least in part on the concept vector and the respective feature vector for the each of the two or more items can include adding the respective feature vector similarity score for the each of the two or more items to the respective search query frequency score for the each of the two or more items.

In several embodiments, method 400 also can include a block 450 of identifying the one item to which the voice command is intended to apply, where the one item is identified from among the two or more items. In many embodiments, block 450 of identifying the one item to which the voice command is intended to apply can be based on which of the two or more items is associated with a highest one of the respective candidate scores for the two or more items. For example, in the example described above in which one item in the cart has a title "Pantene Pro-V Blends Micellar Conditioner Gentle Moisturizing Milk" and a product type of Conditioner, and another item in the cart has a title "Horizon Organic DHA Omega-3 Vitamin D Organic Whole Milk," and a product type of Dairy, to identify the intended item in the voice command with the voice concept of milk, the candidate score for the item with product type of dairy can be higher than a candidate score for the item with the product type of conditioner, which can indicate the intended item to apply the action in the voice command is the dairy item not the conditioner item.

In various embodiments, block 450 of identifying the one item to which the voice command is intended to apply also can include using a dynamic item ranking approach. In some embodiments, the dynamic item ranking approach can begin by transforming each of the items in the cart into respective feature vectors, which can be mathematical objects, such as vector representations of each item, or alternatively, into scalars or tensors. In many embodiments, the dynamic item ranking approach can make parallel calls for each of the items in the cart, such that the computational time can be strictly bounded. In some embodiments, generating a candidate score for each representation of each item in the cart can be implemented using voice command system 310 (FIG. 3). In a number of embodiments, the dynamic item ranking approach can fetch a representation of each item in the cart for comparison with each of the other item in the cart based on a candidate score for each item and the concept vector from voice command.

In some embodiments, method 400 further can include a block of 460 of executing an action with respect to the one item based on the voice command. In many embodiments, identifying the intended item can occur in real time after the voice command is spoken. In various embodiments, the virtual action such as removing the intended item can be performed as the identity of the intended item can be confirmed using the voice command system 310 (FIG. 3).

In several embodiments, block 460 of executing an action with respect to the one item based on the voice command can include removing the one item of two or more items from the cart of the user. In some embodiments, confirming the identity of the intended item and removing the item from a cart per the voice command can be performed as a virtual action. To continue the example, described above, if the user requested through a voice command, "Remove milk from my cart," the item in the cart that is identified as corresponding to the concept of milk can be removed from the cart. In many embodiments, executing an action with respect to the one item based on the voice command can include modifying a quantity of the one item in the cart of the user. In some embodiments, confirming the identity of the intended item and increasing or decreasing the quantity of the intended item in a cart per the voice command can be performed as a virtual action. For example, if the user requests through a voice command, "add another jug of milk," the item in the cart that is identified as corresponding to the concept of milk can have it quantity adjusted in the cart to add an additional one to the existing quantity of the item in the cart.

Figure 5:
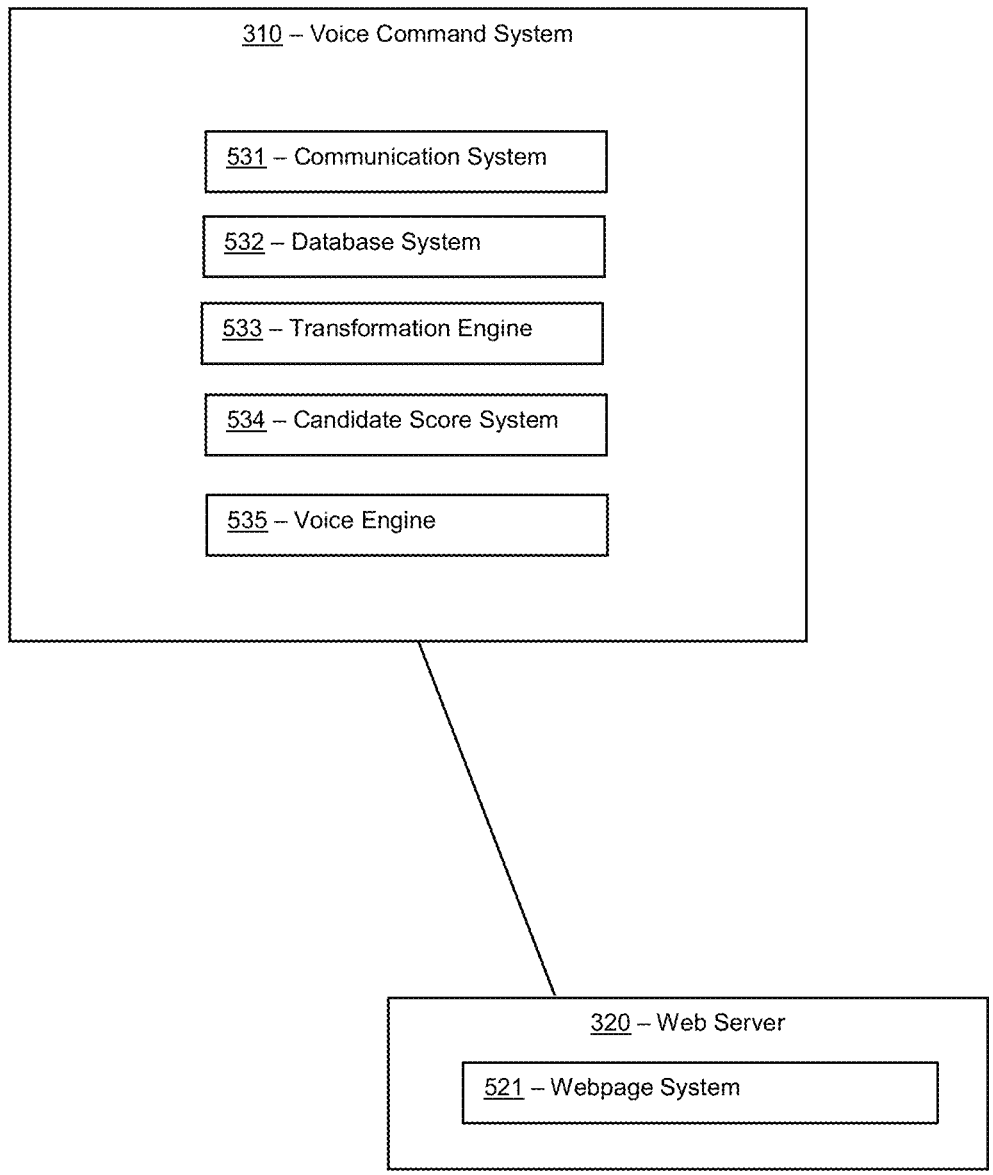
FIG. 5 illustrates a representative block diagram the system of FIG. 3.

Turning to the next drawing, FIG. 5 illustrates a block diagram of system 300, according to the embodiment shown in FIG. 3. Voice command system 310 and/or web server 320 are merely exemplary and are not limited to the embodiments presented herein. Voice command system 310 and/or web server 320 can be employed in many different embodiments or examples not specifically depicted or described herein. In some embodiments, certain elements or systems of voice command system 310 and/or web server 320 can perform various procedures, processes, and/or acts. In other embodiments, the procedures, processes, and/or acts can be performed by other suitable elements or systems. In many embodiments, the systems of voice command system 310 and/or web server 320 can be modules of computing instructions (e.g., software modules) stored at non-transitory computer readable media. In other embodiments, the systems of voice command system 310 and/or web server 320 can be implemented in hardware.

In many embodiments, voice command system 310 can include a communication system 531. In a number of embodiments, communication system 531 can at least partially perform block 410 (FIG. 4) of receiving a voice command from a user to perform a virtual action intended to apply to one item of two or more items in a cart of the user, block 460 (FIG. 4) of executing an action with respect to the one item based on the voice command, block 610 (FIG. 6, described below) of receiving a voice concept, block 620 (FIG. 6, described below) of searching an API, and/or block 710 (FIG. 7, described below) of receiving a user query.

In several embodiments, voice command system 310 also can include a database system 532. In various embodiments, database system 532 can at least partially perform block 410 (FIG. 4) of receiving a voice command from a user to perform a virtual action intended to apply to one item of two or more items in a cart of the user, and/or block 720 (FIG. 7, described below) generating a search of an API.

In some embodiments, voice command system 310 additionally can include a transformation system 533. In many embodiments, transformation system 533 can at least partially perform block 420 (FIG. 4) of generating a concept vector representing a concept in the voice command relating to the one of the two or more items, block 430 (FIG. 4) of transforming the respective item attributes for each of the two or more items into a respective feature vector for the each of the two or more items, block 440 (FIG. 4) of generating a respective feature vector similarity score for the each of the two or more items based at least in part on the concept vector and the respective feature vector for the each of the two or more items, block 635 (FIG. 6, described below) of showing a result set, block 730 (FIG. 7, described below) of collecting search results, block 750 (FIG. 7, described below) of collecting search result vectors, block 760 (FIG. 7, described below) of generating a user query vector, block 810 (FIG. 8, described below) of creating a vector space, block 820 (FIG. 8, described below) of generating vector dimensions, block 830 (FIG. 8, described below) of receiving text, block 840 (FIG. 8) of using an encoder and/or block 850 (FIG. 8, described below) of compressing the embeddings using a decoder.

In some embodiments, voice command system 310 further can include a candidate score system 534. In many embodiments, candidate score system 534 can at least partially perform block 420 (FIG. 4) of generating a concept vector representing a concept in the voice command relating to the one of the two or more items, block 440 (FIG. 4) of generating a respective candidate score for the each of the two or more items based at least in part on the concept vector and the respective feature vector for the each of the two or more items, block 450 (FIG. 4) of identifying the one item to which the voice command is intended to apply, and/or block 640 (FIG. 6, described below) of creating a concept vector.

In some embodiments, voice command system 310 also can include a voice engine 535. In many embodiments, voice engine 535 can at least partially perform block 410 (FIG. 4) of receiving a voice command from a user to perform a virtual action intended to apply to one item of two or more items in a cart of the user, block 460 (FIG. 4) of executing an action with respect to the one item based on the voice command, and/or block 610 (FIG. 6, described below) of receiving a voice concept.

In a number of embodiments, web server 320 can include an online activity tracking system 534. In many embodiments, online activity tracking system 534 can at least partially perform gathering information regarding online orders that is provided to determination system 512.

In several embodiments, web server 320 also can include a webpage system 522. Webpage system 521 can at least partially perform sending instructions to user computers, such as user computer 350-351 (FIG. 3) based on information received from communication system 531.

Turning ahead in the drawings, FIG. 6 illustrates a flow chart of method 600, according to another embodiment. Method 600 can be similar to method 400 (FIG. 4), and various procedures, processes, and/or activities of method 600 can be similar or identical to various procedures, processes, and/or activities of method 400 (FIG. 4). Method 600 can be employed in many different embodiments and/or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped. In several embodiments, system 300 (FIG. 3) can be suitable to perform method 600 and/or one or more of the activities of method 600. In these or other embodiments, one or more of the activities of method 600 can be implemented as one or more computing instructions configured to run at one or more processors and configured to be stored at one or more non-transitory computer-readable media. Such non-transitory computer-readable media can be part of a computer system such as voice command system 310 and/or web server 320. The processor(s) can be similar or identical to the processor(s) described above with respect to computer system 100 (FIG. 1).

In many embodiments, method 600 can include a block 610 of receiving a voice concept. The voice concept can be identified from a voice command. Block 610 of receiving a voice concept can be similar or identical to block 410 (FIG. 4) of receiving a voice command from a user to perform a virtual action intended to apply to one item of two or more items in a cart of the user.

In various embodiments, method 600 also can include a block 620 of using a search API. In some embodiments, the search API can take as input the voice concept received in block 610 as a search query to search a catalog. In some embodiments, the search API can out a number of items matching the voice concept. In a number of embodiments, a top "n" number of items can be returned as output. The number "n" can be a predetermined number, such as five (5), for example. Each of the items can have corresponding attributes, which can be used, based on common attributes among the items to determine the concept vector.

In a number of embodiments, method 600 further can include a block 635 generating a vector for each of the items, such as vectors 630-634, for the five (5) items from the search API. The vectors can include common attributes values to create a concept vector of the voice concept. For example, a value for the attribute of product type in the first element of the vector can be X for vector 630, Y for vector 631, Z for vector 632, X for vector 633, and Z for vector 634, which can be for items, such as product 1 (P1), product 2 (P2), product 3 (P3), product 4 (P4), and product 5 (P5), respectively. The most common attribute value can be X, which can be used for the product type attribute in the concept vector.

In various embodiments, method 600 also can include a block 640 of creating a concept vector. In several embodiments, creating the concept vector can be based determining the most common of the same features listed under each attribute for each common attribute for each item of the five items (e.g., such as P1, P2, P3, P4, and P5). In some embodiments, the most common attribute value for each attribute can be added to the attribute category for concept vector 640. In many embodiments, the collection of each attribute and feature creates the concept vector of the voice concept, which can be similar to generating the concept vector in block 420 (FIG. 4). For example, the search API can return five (5) items based on the voice concept received in block 610 and used as a search query in block 620. The attributes for each of the five items can be used to determined common attributes among six (6) features for the 5 items, such as product type, global product type, shelf title, aisle title, category, and department, similarly as shown in Table 1 and as described above. Each feature of each of the items can be entered in the first box for product type, such as Dairy for P1, Dairy & Food for P2, Food for P3, Dairy P4, and Dairy P5, indicating a most common of the features for the attribute product type is Dairy, thus the first element for product type in concept vector 640 can be set to Dairy. Such a process can be repeated for each attribute element and corresponding feature for each of the items P1, P2, P3, P4, and P5, where the most common of the same features can be added to the corresponding box for concept vector 640, indicating voice concept 610 "milk" can include Dairy as a feature.

Turning ahead in the drawings, FIG. 7 illustrates a flow chart of method 700, according to another embodiment. Method 700 can be similar to method 400 (FIG. 4) and/or method 600 (FIG. 6), and various procedures, processes, and/or activities of method 700 can be similar or identical to various procedures, processes, and/or activities of method 400 (FIG. 4) and/or method 700 (FIG. 6). Method 700 can be employed in many different embodiments and/or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped. In several embodiments, system 300 (FIG. 3) can be suitable to perform method 700 and/or one or more of the activities of method 700. In these or other embodiments, one or more of the activities of method 700 can be implemented as one or more computing instructions configured to run at one or more processors and configured to be stored at one or more non-transitory computer-readable media. Such non-transitory computer-readable media can be part of a computer system such as voice command system 310 and/or web server 320. The processor(s) can be similar or identical to the processor(s) described above with respect to computer system 100 (FIG. 1).

In many embodiments, method 700 can begin with a block 710 of receiving a user query. In several embodiments, user query 710 can include the voice concept and/or the voice command. Block 710 of receiving a user query can be similar or identical to block 410 (FIG. 4) of receiving a voice command from a user to perform a virtual action intended to apply to one item of two or more items in a cart of the user and/or block 610 (FIG. 6) of receiving a voice concept.

In several embodiments, method 700 also can continue with block 720 of performing a search of using a search API. In many embodiments, the search API can search the catalog using the user query received in block 710 (e.g., as received in 610 (FIG. 6) and/or block 410 (FIG. 4)).

In many embodiments, method 700 additionally can include a block 730 of collecting search results from the search API. In some embodiments, the search API can return in the search result multiple items that matched the user query. Such items from the search API can include search result item 731, search result item 732, search result item 733, search result item 734, and search result item 735, which can be similar to the items P1-P5 returned in the search result associated with vectors 630-634 (FIG. 6)).

In various embodiments, method 700 further can include a block 740 of collecting features of each search result. In some embodiments, feature collector 740 can transform corresponding attributes and features for search result items 731-735 into vectors.

In some embodiments, method 700 also can include a block 750 of collecting search result vectors. In several embodiments, there can be a vector for each item. In many embodiments, the collection of search result vectors can include search result vector 751, search result vector 752, search result vector 753, search result vector 754, and search result vector 755, for example.

In many embodiments, method 700 further can include a block 760 of generating a user query vector, which can be similar to the concept vector generated in block 420 (FIG. 4), and/or the concept vector created in block 640 (FIG. 6).

Turning ahead in the drawings, FIG. 8 illustrates a flow chart of method 800, according to another embodiment. Method 800 can be similar to method 400 (FIG. 4), and various procedures, processes, and/or activities of method 800 can be similar or identical to various procedures, processes, and/or activities of method 400 (FIG. 4). Method 800 can be employed in many different embodiments and/or examples not specifically depicted or described herein. In some embodiments, the procedures, the processes, and/or the activities of method 800 can be performed in the order presented. In other embodiments, the procedures, the processes, and/or the activities of method 800 can be performed in any suitable order. In still other embodiments, one or more of the procedures, the processes, and/or the activities of method 800 can be combined or skipped. In several embodiments, system 300 (FIG. 3) can be suitable to perform method 800 and/or one or more of the activities of method 800. In these or other embodiments, one or more of the activities of method 800 can be implemented as one or more computing instructions configured to run at one or more processors and configured to be stored at one or more non-transitory computer-readable media. Such non-transitory computer-readable media can be part of a computer system such as voice command system 310 and/or web server 320. The processor(s) can be similar or identical to the processor(s) described above with respect to computer system 100 (FIG. 1).

In many embodiments, method 800 can perform generating the Cosine Similarity measurement between (a) the concept vector for the concept and (b) the respective feature vector for each of the two or more items, as generated in block 440 (FIG. 4).

In several embodiments, method 800 can include a block 830 of receiving text. In many embodiments, the text can include the text as input (e.g., words and/or sentences), which can be transformed into vectors. For example, an attribute value, such as a product type of an item, can be "Conditioners," and this term can be transformed into a vector representation of embeddings.

In some embodiments, method 800 further can include a block 840 of using an encoder. In many embodiments encoder 840 can embed catalog products as vectors. In various embodiments, encoder 840 can transform the text into a numerical form that represents the text information for analysis by a computer system.

In several embodiments, vectors, as transformed by encoder in block 840, can be used for computing the cosine similarity, such as generating the cosine similarity in as used block 430 (FIG. 4). For example, a vector 820 can include multiple dimensions, such as 256 dimensions, as an example. In several embodiments, vector 820 can be a projection of the text information into a multi-dimensional vector space, such as a 256-dimension vector space.

Graph 810 illustrates a simplified representation of creating a vector space in which there are three dimensions. The vector space in graph 810 shows each of vectors 801-803 in the vector space. For example, vector 801 can be a feature vector for a first item in a cart, vector 802 can be a user query, such as a concept vector for a concept, and vector 803 can be a feature vector for a second item in the cart. In many embodiments, the vector space can be used to compute a cosine similarity between two vectors. For example, vector 802 for the user query can be compared against vector 801 using the cosine similarity, and vector 802 can be compared against vector 802 using the cosine similarity. The cosine similarity can be a dot product between the two respective vectors.

In some embodiments, method 800 additionally can include a block 850 of using a decoder to decode the vector representation.

Conventional methods of ordering items online do not use a voice command and/or the voice query. Instead, the user views the order and/or manually interacts with a user interface of the website. Some previous methods of using voice commands involved extensive clarification questions to identify the intended item, and/or identified items in the cart based on title matching based on the concept in the voice command. In title matching, an n-gram of the item title was used to match the title of the item as the intended item of the command. For example, the voice command using the phrase "potato chips" can be matched with the title of an item in the cart, such as "Ruffles Molten Hot Wings Flavored Potato Chips, 9 oz," indicating an match between the concept in the command and the intended item. However, using title matching was limited when the voice command included the word, such as "milk," intended to apply to an item in the cart, yet two items in the cart included "milk" in their titles. Using the conventional title matching approach, both dairy milk and the conditioner with milk in its title were identified as "milk." In such a scenario, the root item "milk" can be assigned to the conditioner item. Voice command system 310 (FIG. 3) provides a technological improvement over conventional methods of matching items in that cart to the voice concept from the voice command.

In many embodiments, the techniques described herein can provide several technological improvements. Another advantage of systems to detect voice grocery concepts to associate items in the catalog can use the candidate score for two or more items that share similar titles (e.g., common words or common product types) to overcome an existing ambiguity in the title to distinguish the intended item from the unintended items via the voice command and/or voice query. Using the voice command system to detect a grocery concept based on the candidate score for each item in the cart can be advantageous by providing a technological technique to identify the correct intended item. The voice command system can be a technological improvement over conventional methods of detecting items using the voice assistant to execute a virtual action via the concept within the voice command. Conventionally, online catalogs often do not contain a field in the catalog that can be used to reliably match with the voice concept, because there can be multiple candidates items in the cart for the voice concept, such as multiple items that have the concept in the title or in one of the attributes. For example, a conditioner that contains "moisturizing milk" in its item title could have been misclassified as matching a concept of milk rather than the concept of conditioner. In a number of embodiments, the techniques described herein can advantageously provide a consistent user experience by a reduction in errors and/or ambiguities among two or more items with similar titles that are different product types.

Another advantage of using a voice command system to order items from the catalog can include reducing the amount of computer resources expended when the user manually searches for items in an online catalog for a retail store. An online catalog for a retail store can include over eight million (8,000,000) items at any given time. Reducing the use of computer resources can frequently include reductions in CPU usage, memory stores, databases, internet traffic, and/or other related computer resources used for website visits. For example, the number of daily and/or monthly visits to the website can exceed approximately ten million and/or other suitable numbers, the number of registered users to the website can exceed approximately one million and/or other suitable numbers, and/or the number of items and/or items sold on the website can exceed approximately ten million (10,000,000) each day.

In many embodiments, the techniques described herein can be used continuously at a scale that cannot be handled using manual techniques. One advantage of using such an approach can be an improvement over conventional voice recognition techniques by creating a more context-aware voice-activated virtual assistant that can identify an intended item from a voice command among multiple items in an electronic shopping cart.

In a number of embodiments, the techniques described herein can solve a technical problem that arises only within the realm of computer networks, as online shopping using voice assistants, and/or determining whether to execute a virtual action via user command, are concepts that do not exist outside the realm of computer networks. Moreover, the techniques described herein can solve a technical problem that cannot be solved outside the context of computer networks. Specifically, the techniques described herein cannot be used outside the context of computer networks, in view of a lack of data, and because vector representation approach does not exist outside the context of computer networks.

Various embodiments can include a system. The system can include one or more processors and one or more non-transitory computer-readable media storing computing instructions configured to run on the one or more processors and perform certain acts. The acts can include receiving a voice command from a user to perform a virtual action intended to apply to one item of two or more items in a cart of the user. The two or more items can each be associated with respective item attributes. The acts also can include generating a concept vector representing a concept in the voice command relating to the one of the two or more items. The acts further can include transforming the respective item attributes for each of the two or more items into a respective feature vector for the each of the two or more items. The acts additionally can include generating a respective candidate score for the each of the two or more items based at least in part on the concept vector and the respective feature vector for the each of the two or more items. The acts also can include identifying the one item to which the voice command is intended to apply. The one item can be identified from the two or more items, and the two or more items can be based on which of the two or more items is associated with a highest one of the respective candidate scores for the two or more items. The acts additionally can include executing an action with respect to the one item based on the voice command.

Several embodiments can include a method. The method can be implemented via execution of computing instructions configured to run at one or more processors and stored at one or more non-transitory computer-readable media. The method can include receiving a voice command from a user to perform a virtual action intended to apply to one item of two or more items in a cart of the user. The two or more items can each be associated with respective item attributes. The method also can include generating a concept vector representing a concept in the voice command relating to the one of the two or more items. The method further can include transforming the respective item attributes for each of the two or more items into a respective feature vector for the each of the two or more items. The method additionally can include generating a respective candidate score for the each of the two or more items based at least in part on the concept vector and the respective feature vector for the each of the two or more items. The method also can include identifying the one item to which the voice command is intended to apply. The one item can be identified from the two or more items, and the two or more items can be based on which of the two or more items is associated with a highest one of the respective candidate scores for the two or more items. The method additionally can include executing an action with respect to the one item based on the voice command.

Although detecting voice grocery concepts from catalog items has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIGS. 4 and 6-8 may include different procedures, processes, and/or activities and be performed by many different modules, in many different orders, and/or one or more of the procedures, processes, or activities of FIGS. 4 and 6-8 may include one or more of the procedures, processes, or activities of another different one of FIGS. 4 and 6-8. As another example, the systems within voice command system 310 and/or webserver 320 (FIG. 5) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed:

1. A system comprising:
   one or more processors; and
   one or more non-transitory computer-readable media storing computing instructions configured to run on the one or more processors and perform:
      receiving a voice command from a user to perform a virtual action intended to apply to one item of two or more items in a cart of the user, the two or more items each being associated with respective item attributes;
      generating a concept vector representing a concept in the voice command relating to the one of the two or more items;
      transforming the respective item attributes for each of the two or more items into a respective feature vector for the each of the two or more items;
      generating a respective candidate score for the each of the two or more items based at least in part on the concept vector and the respective feature vector for the each of the two or more items;
      identifying the one item to which the voice command is intended to apply, wherein the one item is identified from among the two or more items, and wherein the identifying is based on which of the two or more items is associated with a highest one of the respective candidate score for the two or more items; and
      executing an action with respect to the one item based on the voice command.

2. The system of claim 1, wherein executing the action with respect to the one item based on the voice command further comprises one of:
   removing the one item of the two or more items from the cart of the user; or
   modifying a quantity of the one item in the cart of the user.

3. The system of claim 1, wherein generating the concept vector further comprises:
   performing a search using the concept as a search query to determine a set of items associated with the concept; and generating the concept vector based on common attributes across the set of items.

4. The system of claim 1, wherein generating the respective candidate score for the each of the two or more items further comprises:
generating a respective search query frequency score for the each of the two or more items; and
generating a respective feature vector similarity score for the each of the two or more items.

5. The system of claim 4, wherein generating the respective candidate score for the each of the two or more items further comprises:
adding the respective feature vector similarity score for the each of the two or more items to the respective search query frequency score for the each of the two or more items.

6. The system of claim 4, wherein:
the respective feature vector similarity score for the each of the two or more items is generated using a Jaccard Similarity measurement between (a) the concept vector for the concept and (b) the respective feature vector for the each of the two or more items.

7. The system of claim 4, wherein:
the respective feature vector similarity score for the each of the two or more items is generated using a Cosine Similarity measurement between (a) the concept vector for the concept and (b) the respective feature vector for the each of the two or more items.

8. The system of claim 4, wherein:
the respective search query frequency score for the each of the two or more items is based on a search performed using a search query that is based on a concatenation of (a) a respective brand of the each of the two or more items and (b) the concept.

9. The system of claim 1, wherein transforming the respective item attributes for the each of the two or more items into the respective feature vector further comprises:
generating respective embeddings for the respective item attributes for the each of the two or more items.

10. The system of claim 1, wherein:
the respective item attributes for the each of the two or more items comprise a product type, a global product type, a shelf title, an aisle title, a category, and a department.

11. A method being implemented via execution of computing instructions configured to run at one or more processors and stored at one or more non-transitory computer-readable media, the method comprising:
receiving a voice command from a user to perform a virtual action intended to apply to one item of two or more items in a cart of the user, the two or more items each being associated with respective item attributes;
generating a concept vector representing a concept in the voice command relating to the one of the two or more items;
transforming the respective item attributes for each of the two or more items into a respective feature vector for the each of the two or more items;
generating a respective candidate score for the each of the two or more items based at least in part on the concept vector and the respective feature vector for the each of the two or more items;
identifying the one item to which the voice command is intended to apply, wherein the one item is identified from among the two or more items, and wherein the identifying is based on which of the two or more items is associated with a highest one of the respective candidate score for the two or more items; and
executing an action with respect to the one item based on the voice command.

12. The method of claim 11, wherein executing the action with respect to the one item based on the voice command further comprises one of:
removing the one item of the two or more items from the cart of the user; or
modifying a quantity of the one item in the cart of the user.

13. The method of claim 11, wherein generating the concept vector further comprises:
performing a search using the concept as a search query to determine a set of items associated with the concept; and
generating the concept vector based on common attributes across the set of items.

14. The method of claim 11, wherein generating the respective candidate score for the each of the two or more items further comprises:
generating a respective search query frequency score for the each of the two or more items; and
generating a respective feature vector similarity score for the each of the two or more items.

15. The method of claim 14, wherein generating the respective candidate score for the each of the two or more items further comprises:
adding the respective feature vector similarity score for the each of the two or more items to the respective search query frequency score for the each of the two or more items.

16. The method of claim 14, wherein:
the respective feature vector similarity score for the each of the two or more items is generated using a Jaccard Similarity measurement between (a) the concept vector for the concept and (b) the respective feature vector for the each of the two or more items.

17. The method of claim 14, wherein:
the respective feature vector similarity score for the each of the two or more items is generated using a Cosine Similarity measurement between (a) the concept vector for the concept and (b) the respective feature vector for the each of the two or more items.

18. The method of claim 14, wherein:
the respective search query frequency score for the each of the two or more items is based on a search performed using a search query that is based on a concatenation of (a) a respective brand of the each of the two or more items and (b) the concept.

19. The method of claim 11, wherein transforming the respective item attributes for the each of the two or more items into the respective feature vector further comprises:
generating respective embeddings for the respective item attributes for the each of the two or more items.

20. The method of claim 11, wherein:
the respective item attributes for the each of the two or more items comprise a product type, a global product type, a shelf title, an aisle title, a category, and a department.

* * * * *